United States Patent [19]

Ohsako

[11] 4,321,671
[45] Mar. 23, 1982

[54] BANK NOTE DISPENSING METHOD AND APPARATUS

[75] Inventor: Kyoichi Ohsako, Tokyo, Japan

[73] Assignee: Laurel Bank Machine Co., Ltd., Tokyo, Japan

[21] Appl. No.: 107,562

[22] Filed: Dec. 27, 1979

[30] Foreign Application Priority Data

Dec. 28, 1978 [JP] Japan ............................ 53-164844
Dec. 28, 1978 [JP] Japan ............................ 53-164846

[51] Int. Cl.³ ............................................ G07D 1/00
[52] U.S. Cl. .................................... 364/405; 133/4 R
[58] Field of Search .......................... 364/400–406; 133/4 R, 1 R

[56] References Cited

U.S. PATENT DOCUMENTS

| | | | |
|---|---|---|---|
| 3,801,805 | 4/1974 | Hatanaka et al. | 364/401 |
| 3,807,417 | 4/1974 | Shigemori et al. | 133/1 R |
| 3,828,166 | 8/1974 | Johansson et al. | 133/4 R X |
| 3,958,583 | 5/1976 | Sjigemori et al. | 133/4 R |
| 4,075,460 | 2/1978 | Gorgens | 364/465 X |
| 4,185,646 | 1/1980 | Woods et al. | 364/405 X |
| 4,188,962 | 2/1980 | Onoe et al. | 364/405 X |

Primary Examiner—Edward J. Wise
Attorney, Agent, or Firm—Fleit & Jacobson

[57] ABSTRACT

A bank note dispensing method, in which, when a manually payable sum is included in the sum requested to be repaid, the sum other than the manually payable sum is discharged with the bank notes of preset or specified denominations from a bank note discharger so that they are temporarily stored in a temporary bank note storing place. The feeding operations of the manually payable sum are performed to confirm the manually payable sum so that the discharged bank notes can be taken out of the storing place. Also disclosed is a bank note dispersing apparatus, in which, when the bank note discharger is charged with the bank notes, the totalled sum of the bank notes is fed as an input for each denomination of the charged bank notes so that it may be stored in advance. The balance is calculated and stored each time the bank notes are dispensed. A warning is generated by an electric near-end mechanism when the balance becomes smaller than a preset value.

4 Claims, 5 Drawing Figures

FIG. I

F I G. 2
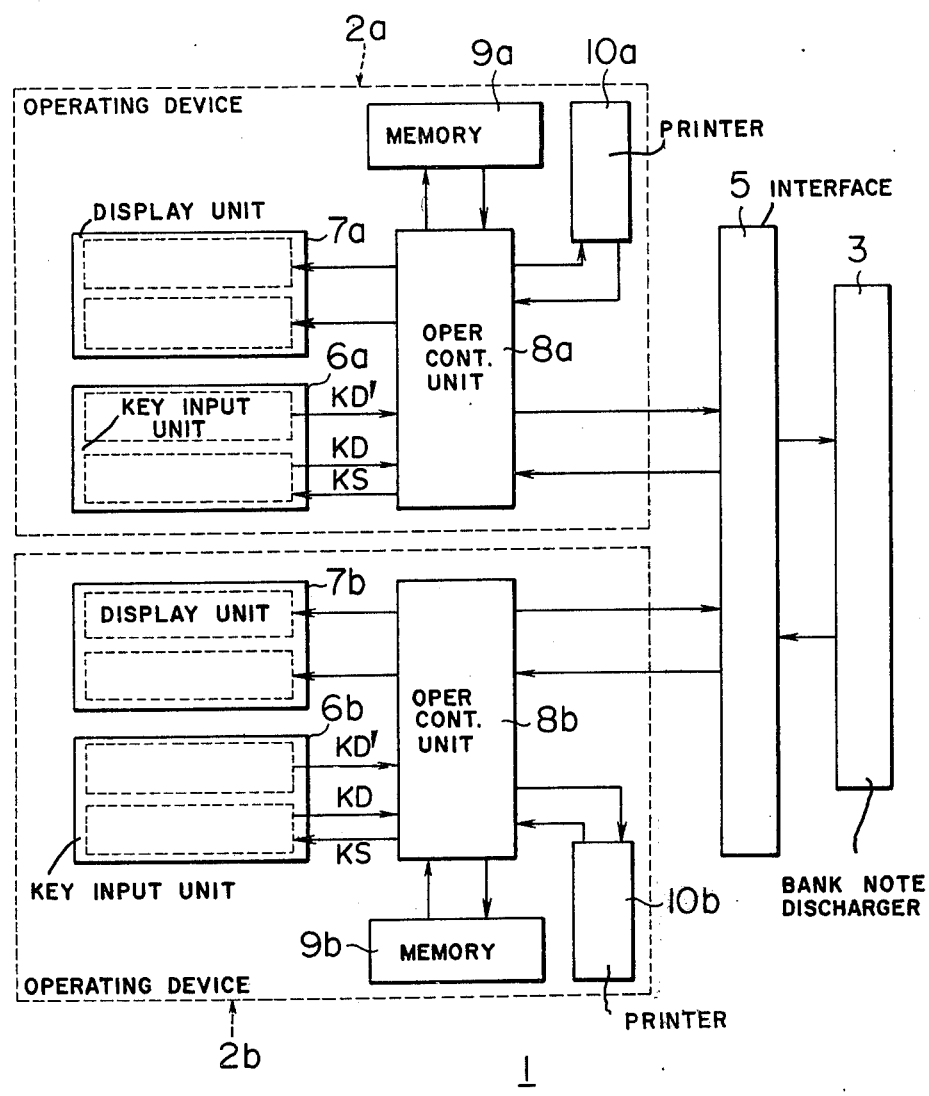

BANK NOTE DISPENSING METHOD AND APPARATUS

BACKGROUND OF THE INVENTION

1. Field of the Invention

The present invention relates to a bank note dispensing method and to a bank note dispensing apparatus using the dispensing method.

2. Description of the Prior Art

When a depositor submits his bank pass-book and a withdrawal slip at the window of a bank, a cashier ordinarily examines the withdrawal slip and dispensing bank notes and coins to him in accordance with the requested sum. During this dispensing work, the cashier takes out and counts the desired number of bank notes and coins and then hands them to the depositor.

This work is complicated and invites counting mistakes so that trouble may arise which cause problems in cash administration. Thus money dispensing apparatus for carrying out cash dispensing operations automatically has recently been developed and put into practice. One such apparatus is disclosed in Japanese Patent Publication No. 53-61817 owned by the present Applicant.

The money dispensing apparatus disclosed is constructed to include an operating device, to which data such as money sums and denominations are fed, and bank note and coin dischargers for automatically dispensing the bank notes and coins in response to commands from the operating device. The bank note discharger is equipped with bank note reserve boxes for different (e.g., four) denominations and a bank note feed out mechanism. On the other hand, the coin discharger is equipped with coin reserve boxes for different (e.g., five) denominations. The money dispensing apparatus thus constructed can dispense money automatically in response to the operations of the operating device with the resultant advantages that work can be reduced and that the speed and accuracy of the dispensing work can be improved. Since, however, the money dispensing apparatus is so made that it can dispense the money of all the denominations that are circulating in Japan at present, it has a disadvantage in that the complicated mechanism used make it expensive.

The bank note boxes of the aforementioned bank note discharger are equipped with a near-end mechanism which is made operative to determine the quantity of bank notes in stock from the thickness of the stack of bank notes and to generate a warning when the supply is low. When the warning is generated by the near-end mechanism, the cashier at once interrupts the bank note dispensing operation so that the supply of bank notes can be replenished.

With the use of such a near-end mechanism, however, the warning is not always generated when the numbers of bank notes drops to exactly the same level. Normally, the number of bank notes remaining is smaller than the number of new ones to be inserted. If only few bank notes are left when the warning is generated, the number of the bank notes that must be prepared in advance to replenish the machine stock will become so unfixed as to invite a practical inconvenience as well as another disadvantage that the mechanism of the bank note discharger will become complicated.

SUMMARY OF THE INVENTION

Taking the above background into consideration, it is therefore an object of the present invention to provide a bank note dispensing method which reduces the cost of the required facilities while reducing the cash dispensing work.

Another object of the present invention is to provide a bank not dispensing apparatus which can carry out such preset operations as to generate the near-end warning when the total value (or the number) of the bank notes left becomes smaller than a preset value.

According to a primary feature of the present invention, there is provided a bank note dispensing method comprising the steps of: keying a key input unit to feed as an input the sum of money requested to be repaid; classifying the input sum into a sum to be manually dispensed and into the remaining sum (the difference between the input sum and the sum to be dispensed manually); discharging said remaining sum with the bank notes either in preset denominations or in such denominations as are specified by the keying step of said key input unit; temporarily storing the discharged remaining sum of the bank notes automatically in a temporary storing place; and keying said key input unit to feed said manually dispensible sum as an input so that said remaining sum of the bank notes stored can be taken out.

According to a secondary features of the present invention, there is provided a bank note dispensing apparatus comprising: a bank note dispensing mechanism having a bank note reservoir adapted to be charged with a preset number of bank notes; means made receptive of the totalled sum of the charged bank notes for storing said totalled sum as a pay-out reserve sum; means for calculating and storing the remaining pay-out reserve sum on the basis of the once stored pay-out reserve sum upon each bank note dispensing operation when the dispensing operations are started; means for effecting the calculating and storing operations and the bank note dispensing operations until the calculated remaining pay-out reserve sum becomes smaller than a preset sum; and means for interrupting the bank note dispensing operations when said calculated remaining pay-out reserve sum becomes smaller than said preset sum.

BRIEF DESCRIPTION OF THE DRAWINGS

In the Drawings:

FIG. 2 is a block diagram showing the electric circuitry of the dispensing apparatus of FIG. 1;

DESCRIPTION OF THE PREFERRED EMBODIMENT

Figure 1:
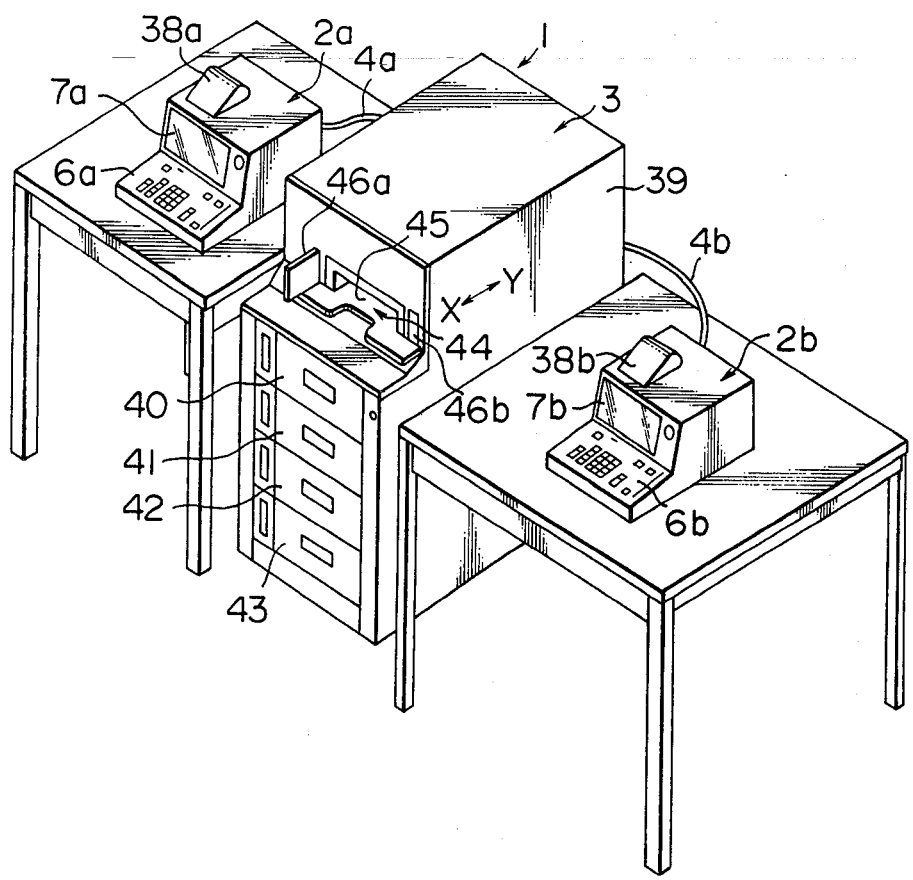
FIG. 1 is a perspective view of a bank note dispensing apparatus exemplifying the present invention.

The present invention will now be described in connection with one embodiment thereof with reference to the accompanying drawings, as follows. As shown in FIGS. 1 and 2, a bank note dispensing apparatus 1 according to the embodiment of the present invention is composed basically of an operating device 2a or 2b and a bank note discharger 3. Especially in this instance, the single bank note discharger 3 is controlled by the two operating devices 2a and 2b which are operated by two cashiers or operators. For this purpose, the operating device 2a is electrically connected with the bank note discharger 3 through a cable 4a and an interface 5. The other operating device 2b is electrically connected with the bank note discharger 3 through a cable 4b and the interface 5. The operating devices are made receptive of not only various data such as data on denominations or sums but also various commands such as commands for manual pay-outs. For this purpose, the operating devices 2a and 2b are equipped, respectively, with key input units 6a and 6b and display units 7a and 7b. The operating devices 2a and 2b are further equipped in their bodies, respectively, with operation control units 8a, 8b, memory units 9a and 9b, and printing units 10a and 10b, all of which are operative to accomplish various operations of the present embodiment such as bank note dispensing operations or printing operations (Reference should be made to the flow chart of FIG. 5).

On the other hand, the aforementioned memory units 9a and 9b are equipped with such registers as are necessary for accomplishing the aforementioned various operations, i.e. dispensing registers, command registers (for four kinds of bank notes), pay-out command registers, command remaining registers, denomination registers (of three kinds), manual dispensing registers, entry registers, discharge registers (of three kinds), pay-out reserve registers (of three kinds), and total registers. The functions of these registers will be described in the later detailed description of the operations in accordance with the flow chart of FIG. 5. On the other hand, the major operations to be performed by the aforementioned operation control units 8a and 8b include, as will be described in detail: (a) the respective setting operations of the dates in a date mode and the sums in the pay-out reserve registers of different kinds; (b) the dispensing operations in case a depositor does not indicate the denominations (In this case, both the operations of classifying the aforementioned input sums into the different denominations such that the number of the bank notes to be dispensed becomes the minumum for the input sum and the operations of commanding the manual pay-out of the sum of the fraction smaller than ￥1000 in case that sum of the fraction is included when the denominations are classified in that way are accomplished); (c) the dispensing operations in case the depositor indicates the denomination or denominations (These operations are composed of the operations of manually dispensing the sum with the money of the indicated denomination, if this denomination is indicated, the operations of classifying the remaining input sum excepting that to be manually dispensed in accordance with the denominations, and the operations of commanding the manual pay-out of the aforementioned fraction of the sum to be dispensed); (d) the electric near-end detecting operations of whether or not the remaining amounts of the pay-out reserve sums of the different denominations are smaller than a preset value (which is ￥0 in the case of the embodiment); (e) the processing operations when the aforementioned near-end takes place; (f) the pay-out controlling operations of the bank note discharger 3; (g) the print controlling operations of the printing units 10a and 10b; (h) the adjusting operations in the aforementioned summing mode; and (i) the selecting operations of preferring the dispensing operations of one of the operating devices 2a and 2b to the bank note discharger 3.

Figure 3:
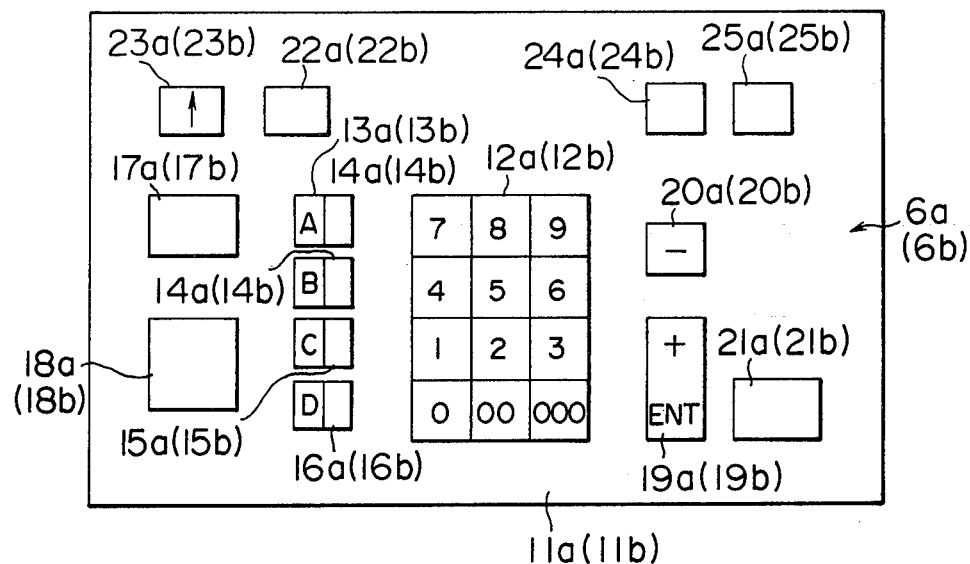
FIGS. 3 and 4 are top plan views showing the key input unit and display unit of the dispensing apparatus.
Figure 4:
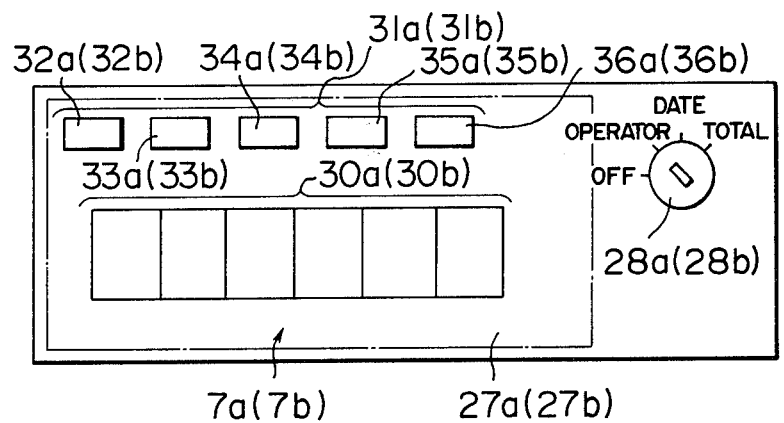

With reference to FIGS. 3 and 4, the constructions of the aforementioned key input units 6a and 6b and display units 7a and 7b will be described in the following.

Here, since the operating devices 2a and 2b have exactly the same construction, the following description is limited to the construction of the operating device 2a, but the construction of the other operating device 2b would be the same if the suffix b were attached to the reference numerals shown in the drawings. On an operating panel 11a, as shown in FIG. 3, there are arranged number keys 12a for inputs of number data such as the sums, different denomination key 13a, 14a, 15a and 16a which are provided for the bank notes of different denominations (such as bank notes of ￥10000, ￥5000, ￥1000 and ￥500) for receiving the inputs of the denomination data, a cancelling key 17a, a correcting key 18a, a summing-entry key 19a, a subtracting key 20a, a pay-out command key 21a, a manual pay-out command key 22a, a feed key 23a, a subtotal key 24a, and a total key 25a. These various keys 12a to 25a are scanned with the key scanning signals KS coming from the operation control unit 8a to have their ON and OFF conditions detected so that the key data KD detected are fed to and processed by the operation control unit 8a. Incidentally, the aforementioned denomination keys 13a to 16a can also be used as the classifying keys for affording classes A, B, C and D.

As shown in FIG. 4, on the other hand, a key switch 28a is arranged on a display panel 27a at the upper righthand portion. The key switch 28a is adapted to be changed over by means of either a (not-shown) master key, which is used only by a bank manager, or a (not-shown) operator key which is used only by the cashier in charge. The key switch 28a is made, as shown, to have four kinds of interchangeable positions, i.e., "OFF", "OPERATION", "DATE" and "TOTAL" so that it can set the bank note dispensing apparatus 1 in one of the modes ("OFF", "OPERATION", "DATE" and "TOTAL" modes) respectively corresponding to those interchangeable positions. When the master key is to be used, the key switch 28a can be changed over to any of the aforementioned four interchangeable positions. By the use of the operator key, on the contrary, the key switch 28a can be interchanged between the "OFF" and "OPERATION" positions.

In the "OFF" mode the bank note dispensing apparatus 1 is disconnected from its power source. At this time, the data in the memory unit 9a are stored in and protected by the backup memory. In the "OPERATION" mode the normal bank note repaying operations can be performed. Therefore, the cashiers, at the beginning of his work, change the position of the key switch to the "OPERATION" position by means of his operator key so that the bank note dispensing apparatus 1 is made ready for operation. The "DATE" mode is preset by the bank manager by means of his master key before business is started. After the dispensing apparatus 1 has been preset to the "DATE" mode, the number keys 12a and the summing-entry key 19a are used to feed the date of that business day. For example, when a date of December 28th of Showa 53th (or 1978) is to be fed, the number keys "5", "3", "1", "2", "2" and "8" are consecutively operated, and then the summing-entry key 19a is operated. Incidentally, the date must not be fed as data other than the data of six figures so that the date data having figures other than six are processed as errors by the operation control unit 8a. If, on the other hand, the bank note dispensing apparatus 1 is suddenly set in the "OPERATION" mode to perform the bank note dispensing operations without feeding and storing the date in the memory unit 9a before the business is started, this operation is processed as another error. In other words, after the operations of the "TOTAL" mode, as will be described later, the "OPERATION" mode must not be accomplished until the "DATE" mode is accomplished. On the other hand, when the totalled sum of the charged bank notes of preset denominations (including the notes of ¥10000, ¥5000 and ¥1000 in this instance) is fed as input together with their denominations after the bank note discharger 3 is charged with the bank notes of the respective denominations, the input must not be fed until the bank note repaying apparatus 1 is set in that "DATE" mode. In this instance, after the key switch 28a is set in its "DATE" mode, the number keys 12a, the denomination keys 13a to 15a and the summing-entry key 19 are consecutively operated to feed the sum data and the denomination data. Then, those data are stored in the pay-out reserve registers which are provided in the memory unit 9a for the respective denominations.

In the embodiment under consideration, incidentally, the bank note discharger 3 is commonly used by the operating devices 2a and 2b. As a result, it is sufficient that the feed of the input of the totalled sum of the bank notes charged be performed once with the use of one of the operating devices 2a and 2b. And, the totalled sum fed is further fed simultaneously to the respective pay-out reserve registers of different denominations in the memory unit 9a or 9b. On the other hand, the subtracting operations of the sums in the pay-out reserve registers, which are performed for the respective bank note dispensing operations, are accomplished simultaneously for the pay-out reserve registers of the same denomination in the memory units 9a and 9b. In other words, the contents of the sums, which are stored in the pay-out reserve registers of the same denomination in the memory units 9a and 9b, are always the same.

The "TOTAL" mode is the mode, which can be set by the master key after the business is ended, so that it can adjust the balance on that day. The data thus adjusted are printed out on printing paper by the action of the printing unit 10a. As has been described in the above, after the operations in the "TOTAL" mode are accomplished, the operations in the "OPERATION" mode must not be accomplished until the operations in the "DATE" mode are accomplished. Incidentally, the respective mode data KD' generated by the aforementioned key switch 28a are fed to the operation control unit 8a.

The display unit 7a is further equipped with sum displays 30a of six figures and alarm-command displays 31a of five kinds. There are displayed in the sum displays 30a both the sum data, which are fed by the cashier using the number keys 12a, and the various sum data such as the data of the manually payable sum, which are fed from the operation control unit 8a. Incidentally, the date data and classification data in the aforementioned date data are also displayed by commonly using the sum displays 30a. The aforementioned alarm-command displays 31a are composed of a slip print command display 32a, an operational error alarm display 33a, a bank note abnormality alarm display 34a, a bank note shortage alarm display 35a, and a manually payable sum input command display 36a.

The slip print command display 32a is lit and displayed, after the later-described bank note dispensing operations (or the counting and discharging operations) and the input operations of feeding the manually repayable sum as the inputs are performed, to command the cashier to insert a (not-shown) slip into a printing mechanism 38a in the operating device 2a so that the data of the denominations and the sum of the bank notes dispensed at that time may be printed on the slip. The operational error alarm display 33a is a display for alarming the clerk of the error in the key operations, and the subsequent normal operations are not effected unless operations for correcting the error are performed. The bank note abnormality alarm display 34a is a display for giving an alarm of the generation of jamming and double feed which takes in the bank note discharger 3 during the counting operations. During jammed condition, incidentally, the operations of the bank note discharger 3 are interrupted. During the double feed condition, however, the operations of the bank note discharger 3 are continued after merely storing the faulty bank notes in a reject box 40 (which is shown in FIG. 1). The bank note shortage alarm display 35a is lit and displayed, when the pay-out reserve sum which is stored in the pay-out reserve register of the repayable denomination is short in comparison with the sum requested at that time, thereby to inform the cashier of that fact that the bank note discharger 3 has to be newly charged with bank notes of that denomination. Moreover, the manually payable sum input command display 36a is a display for displaying the aforementioned input operations of feeding the manually payable sum as the input. At that time, the cashier has to operate the number keys 12a of the like thereby to feed the manually payable sum as the input after he visually confirms the manually payable sum which is simultaneously displayed in the sum displays 30a.

The construction of the bank note discharger 3 will now be described in more detail with reference to FIG. 1. The discharger 39 has its body 39 equipped at its upper front side with a bank note pay-out exit 44 and at its lower portion with the aforementioned reject box 40, a reserve box 41 for bank notes of ¥10000, a reserve box 42 for bank notes of ¥5000 and a reserve box 43 for bank notes of ¥1000. The apparatus body 39 is further equipped therein with a (not-shown) bank note feed-out mechanism for feeding out the bank notes to the aforementioned the bank note pay-out exit 44. The reject box 40 is used to reserve the bank notes which are rejected when abnormal phenomena such as double feed take place. The aforementioned respective bank note reserve boxes 41, 42 and 43 are charged with a plurality of the bank notes in the aforementioned "DATE" mode. The bank note pay-out exit 44 is composed of a temporary bank note storing place 45 and a (not-shown) take-out window which is operative to automatically open and close the take-out opening of the temporary bank note storing place 45. As a result, the bank notes, which are temporarily stored in the place 45, are kept accessible until the cashier performs the aforementioned manual sum input operations thereby to open the aforementioned take-out window. According to the present invention, more specifically, in case the sum requested contains bank notes or coins corresponding to the sum to be manually dispensed, the aforementioned take-out window is not opened, unless the confirming operations by the aforementioned manual pay-out sum input operations are performed, so that the bank notes dispensed to the temporary bank note storing place 45 (or the bank notes automatically paid out) cannot be taken out by the cashier. Moreover, there are arranged at either side of the bank note take-out exit 44 one of shielding plates 46a and 46b which are made movable into and out of the apparatus body 39 in the directions of arrows X and Y. FIG. 1 shows the condition, under which the lefthand shielding plate 46a protrudes, and this condition implies that the operations of the operating device 2b is preferred. More specifically, since the bank notes by the operations of the operating device 2b are dispensed to the bank note pay-out exit 44, only the cashier in charge of the operating device 2b can take out the aforementioned bank notes. Thus, operational confusion (or the mistaken pickup of the bank notes paid out) by the cashiers when the single bank note discharger 3 is commonly controlled by the two operating devices 2a and 2b can be prevented.

The aforementioned bank note feed-out mechanism is further equipped therein with a first sensor for counting the different kinds of the bank notes, which are fed out from the reserve boxes 41, 42 and 43, respectively, and a second sensor for detecting the troubles such as the aforementioned double feed or jamming of the bank notes. The number data of the different kinds of the bank notes, which are counted by the first-named sensor, are converted into the corresponding sum data and fed to the operation control units 8a and 8b, where the subtracting operations between the sum data and the contents of the pay-out reserve registers of the corresponding denominations. As a result, if it is counted by the first-named counter that one of the bank notes of ¥10000 is fed out, the sum of ¥10000 is subtracted from each of the contents of the respective pay-out reserve registers of the bank note of ¥10000 in the memory units 9a and 9b so that the renewed pay-out reserve sum (i.e., the balance of the pay-out reserve sum) is calculated.

In the vicinity of each of the operating devices 2a and 2b, moreover, there are arranged (not-shown) manually repayable sum reserve boxes which are charged with the bank notes of ¥500 and the respective coins of ¥100, ¥50, ¥10 and ¥1 to be manually dispensed so that the respective cashiers in charge of the operating devices 2a and 2b can take out the aforementioned money to be repaid.

Figure 5:
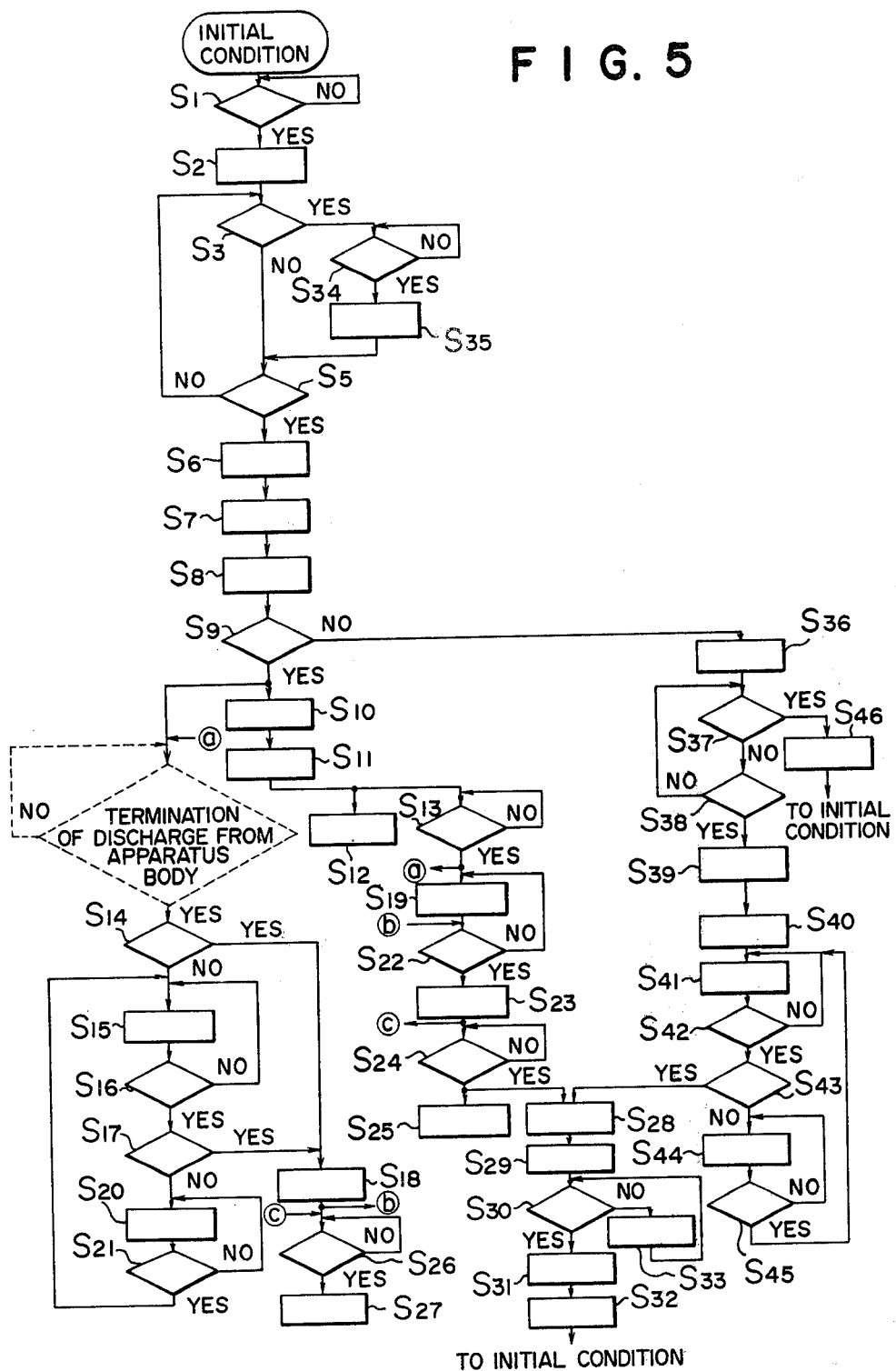
FIG. 5 is a flow chart for illustrating the operations of the dispensing apparatus.

Turning to the flow chart of FIG. 5, the operations of the present invention will be described in the following. Prior to the start of the business on that day, the manager uses his master key to shift the key switch 28a (or 28b) to the "DATE" changing position (in the "DATE" mode) so that the date of that day is preset. For the date setting purpose, the number key 12a (or 12b) and the summing-entry key 19a (or 19b) are used so that date data of six figures are fed as an input and stored in the date register of the memory unit 9a (or 9b). During this "DATE" mode, moreover, the reserve boxes 41 to 43 of the respective denominations are charged with preset sums of new bank notes, and the sums thus charged are fed as inputs in accordance with the denominations by the use of one of the operating devices 2a and 2b. In this instance, the number keys 12a (12b), the denomination keys 13a (13b) to 15a (15b), and the summing-entry key 19a (19b) are consecutively operated. As a result, the pay-out reserve registers for the three denominations, which are mounted in the memory units 9a and 9b of the operating devices 2a and 2b, respectively, are stored simultaneously and in advance with the respective sums (or the respective totalled sums) in the respective reserve boxes 41 to 43.

When the business of that day is started after the foregoing preparatory operations, the cashiers using A and B of the operating devices 2a and 2b each uses his operation key to interchange the key switch 28a (28b) to the "OPERATION" mode so that the respective operating devices 2a and 2b are set in the "OPERATION" mode thereby to make it possible to start dispensing operations.

Now, the first operations, in which the operating device 2b is controlled by the cashier B to dispense th sum of ¥16,800 without specifying the denominations, will be described in the following. When the numeral keys 12a and the summing-entry key 19b are operated to feed the sum of ¥16,800 as an input, the respective operations of steps $S_1$ "Input of the sum demanded to be repaid" and $S_2$ "Storage of the input sum in the repay register" are accomplished so that the input sum ¥16,800 is fed to and stored in the pay-out register in the memory unit 9b. When the pay-out command key 21b is turned on, there is no specification of the denominations so that the operations are advanced through steps $S_3$ "Denominations specified" and $S_5$ "Pay-out command key ON" to step $S_6$ "Storage of the subtraction of all Command Registers from Pay-out Register in Command Residual Register". In this step $S_6$, the contents (all ¥0 in this case) of the respective command registers of the different denominations from the content (¥16,800) of the aforementioned pay-out register, and the operational result (¥16,800) are fed to the command residual register. As a result, the content of the command residual register becomes ¥16,800. Then, the operations are further advanced to step $S_7$ "Distribution and storage of the sum of Command Residual Register in respective Denomination Registers in combination of the minimum number of notes to be dispensed, and Storage of the sum smaller than or equal to the denominations of ¥100 in Manual Pay-out Register". In this step $S_7$, the sum ¥16,800 of the command residual register is so classified as to have the minimum of notes to be dispensed so that it is fed to the respective denomination registers and so that the sum of the fraction smaller than ¥1000 (or smaller than or equal to ¥100) is fed to the manual pay-out register. As a result, the registers of ¥10000, ¥5000 and ¥1000 and the manual pay-out register are supplied with the sums of ¥10000, ¥5000, ¥1000 and ¥800, respectively.

Then, the operations are advanced through step $S_8$ "Additions of the contents of Denomination Register and Manual Pay-out Register to the contents of commanded Denomination Registers and Manual Pay-out Command Register, respectively, thereby to store the added sums in Denomination Registers and Manual Pay-out Command Register, respectively" to step $S_9$ "Substraction of Denomination Registers from Pay-out Reserve Registers>0 (for the three denominations)". In this step $S_9$, the operations of subtracting the contents of the denomination registers from the contents of the pay-out reserve registers of the corresponding different denominations (or the sums which are being charged in the bank note discharger 3 at that time) are accomplished simultaneously for the aforementioned pay-out reserve registers of the different denominations in the respective memory units 9a and 9b thereby to judge whether pay-out is possible or not. In this instance, for example, the content (¥10000) of the aforementioned register of ¥10000 is subtracted from the content of the pay-out reserve register of ¥10000 thereby to judge whether the subtracted result is larger than ¥0 or not. If, now, the subtracted results for the respective denominations ¥10000, ¥5000 and ¥1000 in the respective memory units 9a and 9b are larger than ¥0, the pay-out can be made so that the operations are advanced to step $S_{10}$ "Transfer of the contents of Denomination Registers to Discharge Register". In this step $S_{10}$, the contents of the respective denomination registers are transferred to the discharge registers of the corresponding denominations. Then, in step $S_{11}$ "Start of discharge from the Apparatus Body", the bank note discharging operations are accomplished by the bank note discharger 3. More specifically, the bank notes are fed out one by one from the reserve boxes 41, 42 and 43 of the respective denominations and are stored on the temporary bank note storing place 45. As a result, the temporary bank note storing place 45 receives the bank notes ¥10000, ¥5000 and ¥1000, one note each. Upon the bank note discharging operations, moreover, the operations of steps $S_{12}$ "Subtraction of the sums to be paid out, which have passed through the sensors of the respective denominations, by means of Pay-out of Reserve Registers of the respective denominations in the Apparatus Body" and $S_{13}$ "Termination of normal discharge" are performed in a concurrent manner. In the step $S_{12}$, more specifically, the bank notes of ¥10000, ¥5000 and ¥1000 are counted, when they are fed out one by one from the aforementioned reserve boxes 41, 42 and 43, by the actions of the first-named sensor, and the contents of the respective pay-out reserve registers of the bank notes ¥10000, ¥5000 and ¥1000 are subjected to subtractions of ¥10,000, ¥5,000 and ¥1,000 thereby to calculate the new pay-out reserve sums. The sums thus calculated are simultaneously stored in the pay-out reserve registers of the corresponding denominations in the memory units 9a and 9b so that they are prepared for the subsequent bank note dispensing operations. In the operations of the step $S_{13}$, on the other hand, the generation of the double feed and jamming of the bank notes is detected by the actions of the second-named sensor. At this time, incidentally, if the double feed or jamming is detected, the aforementioned bank note abnormality alarm display 34b is lit and displayed.

When the bank note discharging operations are normally terminated, the operations are advanced to step $S_{14}$ "Content of Manual Pay-out Register=0". In this step $S_{14}$, it is determined whether the content of the manual pay-out register is at ¥0 or not. In the example being considered, since the manual pay-out register is stored with the fractional sum of ¥800, the content is not at ¥0 so that the operations are advanced to step $S_{15}$ "Display of the content of Manual Pay-Out Register, manual processing and input demand". In this step $S_{15}$, the content ¥800 of the manual pay-out register is displayed in the sum displays 30b, and the manually repayable sum input command display 36b is lit to command the clerk B to feed the manual repay sum ¥800 as an input. Then, the clerk takes the commanded sum ¥800 out of the (not-shown) repay money storing box and operates the numeral keys 12b and the manual repay command key 22b to feed the sum ¥800 as the input thereby to effect the operations of step $S_{16}$ "Input of manual repay sum". Then, the operations are advanced to step $S_{17}$ "Entry sum=Manual Pay-Out Register" thereby to confirm whether or not the sum fed is coincident with the content of the manual pay-out register. If, in this instance, the sum ¥800 is correctly fed, the operations are advanced to step $S_{18}$ "Output of feedable signals to Take-out Exit". In this step $S_{18}$, the feedable signals for allowing the clerk to manually take out the bank notes of ¥10000, ¥5000 and ¥1000, which have been stored in the temporary bank note storing place 45 during the operations of the steps $S_{14}$ to $S_{17}$ manually one by one (under the condition of step $S_{19}$ "Stand-by in storage position" are generated to open the aforementioned take-out window. In case, on the other hand, a mistaken sum other than ¥800 is fed, the operation displaying operations of steps $S_{20}$ "Display of operational error" and $S_{21}$ "Correcting Button ON" and the operations of the correcting key 18b are accomplished to return to the step $S_{15}$ so that the payable sum is fed again.

When the aforementioned feedable signals are generated in these ways, the aforementioned three bank notes are taken out of the take-out exit by the cashier B in response to the operations of steps $S_{22}$ "Feedable" and $S_{23}$ "Fed-out". If this condition is detected by such a bank note detector at the take-out exit as is composed of a photoelectric detector, although not shown, the aforementioned take-out window is shut off by the respective operations of steps $S_{24}$ "Termination of take-out" and $S_{25}$ "Return to the initial position of Apparatus Body" so that the bank note discharger restores to its initial condition. By the respective operations of steps $S_{26}$ "Termination of feed-out" and $S_{27}$ "Reset of feedable signals", the aforementioned feedable signals are reset and not fed out.

Concurrent with the respective operations of the aforementioned steps $S_{24}$ to $S_{27}$, the operations of step $S_{28}$ "Printing of dealed content" are accomplished so that the slip print command display 32b is lit. Simultaneously with this, the operations of step $S_{29}$ "Addition and storage in Total Register" are performed so that the contents of the aforementioned denomination registers and manual repay register are fed to and totalled by the adjusting total register. When, on the other hand, the cashier B inserts a preset slip into the printing mechanism 38b, this condition is detected in response to the operations of step $S_{30}$ "Insertion of the confirmed slip" so that the operations of step $S_{31}$ "Printing of the slip" for printing the slip with the contents of the aforementioned respective registers are carried out. If, incidentally, the cashier B fails to insert the slip or the inserted condition is incorrect, the alarming operations using the display or alarming sounds are accomplished in response to the operations of step $S_{33}$ "Display of insertion command".

When the cashier B takes out the bank notes of ¥10000, ¥5000 and ¥1000, one note each, from the take-out exit in the manner thus described, he hands them to the depositer together with the manually payable sum ¥800 which has been readied in the aforementioned steps $S_{15}$ and $S_{16}$.

Next, the second operations, in which the sum of one bank note of ¥500 in the aforementioned sum ¥16,800 is specified by a depositor, will be described in the following. In this case, the operations of the steps $S_1$ and $S_2$ are similar to those of the first example. And the cashier B operates the denomination key 16b of the bank note of ¥500 to feed the denomination data and then operates the number keys 12b and the summing-entry key 19b to feed the sum ¥500 as an input. Then, the sum ¥500 is fed to and stored in the command register of the bank note of ¥500 by the operations of steps $S_{34}$ "Input of the sum" and $S_{35}$ "Storage of the itemized sum in the command register of the denomination concerned". When the cashier B then operates the pay-out command key 21b, the operations are advanced through the step $S_5$ to the step $S_6$. In this example, since only the content of the command register of ¥500 is ¥500 in the step $S_6$, the content of the command residual register becomes ¥16,300. Then, the contents of the registers of ¥10000, ¥5000 and ¥1000 and the manual pay-out register are made to take the sums of ¥10,000, ¥5,000, ¥1,000 and ¥300, respectively, by the processing of the step $S_7$. Then, the operations are advanced to the step $S_8$, in which the content ¥500 of the aforementioned command register of the bank note ¥500 is not added to the manual pay-out register so that the content of the manual pay-out register is left unchanged at ¥300 while holding the sum ¥500 in the aforementioned ¥500 command register. The respective operations of the steps $S_9$ and so on are subsequently carried out in similar manners to those of the first example. In the second example, however, the command of dispensing the bank note of ¥500 is received but no pay-out mechanism is provided in the apparatus body thereby to automatically effect the manual pay-out. As a result, the cashier is required to manually pay-out the sum ¥500, which is held in the aforementioned ¥500 command register, in the bank note and to manually repay the remaining sum ¥300 such that each of the operations is performed once. As a result, the respective operations of the steps $S_{14}$ to $S_{17}$ are repeated twice. In this example, incidentally, it is quite natural that the manually payable input command display 36b effects displaying operations twice and that the sum displays 30b display the manual pay-out sums ¥500 and ¥300 twice.

In case, moreover, the bank note of ¥500 is requested by the depositor, the sum ¥500 requested is stored in the ¥500 command register by the processing of the step $S_{35}$. In the processing of the step $S_7$, moreover, the fractional sum other than the bank note of ¥500 requested is stored in the manual pay-out register (In the second example, the content of the manual register assumes the resultant value of ¥300). In the processing of the step $S_8$, on the other hand, the sum stored in the aforementioned ¥500 command register is transferred to the manual pay-out register of the bank note of ¥500, which is specially provided separately of the aforementioned manual pay-out register, (In the second example, the content of the manual pay-out register assumes the resultant value of ¥300 whereas the content of the ¥500 manual pay-out register assumes the resultant value of ¥500) so that it can be stored therein. By providing the ¥500 manual repay register in that way, the sum ¥500 is fed to the ¥500 manual pay-out register, only when the bank note of ¥500 is requested, so that the processings of the aforementioned steps $S_{14}$ to $S_{17}$ can be easily put into practice.

On the other hand, as an operational example similar to the second one thus far described, there is conceived another example, in which the denomination commanding operations are accomplished at least twice before the pay-out command key 21b is depressed. More specifically, if the commanding operations of the denomination of ¥500 are repeated twice, it is apparent that the respective processings of the aforementioned steps $S_3$, $S_{34}$ and $S_{35}$ are repeated twice. On the other hand, even in case the bank notes of both ¥500 and ¥100 are commanded, it is also apparent that the respective processings of the aforementioned steps $S_3$, $S_{34}$ and $S_{35}$ are repeated likewise twice. It is also apparent that the operational example of accomplishing the commanding operations of the denominations at least three times can be accomplished.

Now, the third operational example for dispensing the sum of ¥16,000 having no fraction without commanding the denominations will be described in the following. In this example, the pay-out register is stored with the sum ¥16,000 by the processing of the step $S_2$, and the command residual register is stored with the sum ¥16,000 by the processing of step $S_6$. By the processing of the step $S_7$, moreover, the registers of ¥10000, ¥5000 and ¥1000 are stored with the sums of ¥10,000, ¥5,000 and ¥1,000. Then, the respective processings of the steps $S_8$ to $S_{13}$, $S_{19}$, $S_{22}$ to $S_{25}$ and $S_{28}$ to $S_{32}$ are effected similarly to the case of the first example. In the case of the third example, on the other hand, the content of the manual pay-out register is at the value of ¥0 so that the processings of the steps $S_{14}$ and $S_{18}$ are accomplished while leaving the aforementioned display 36b and the sum displays 30b inoperable. Therefore, it is naturally unnecessary to accomplish the feeding operations of the manually payable sum so that the aforementioned take-out window is automatically opened when the bank notes are stored in the temporary bank note storing place.

Now, the operation in case the pay-out reserve sum of the repay reserve register of ¥10000 is short in the processing of the step $S_9$ of the first-named operational example will be described in the following. In this example, the operations are advanced from the step $S_9$ to step $S_{36}$ "Display of bank note shortage", in which the bank note shortage alarm display 35b is lit to inform the cashier B of this shortage. If, at this time, the cancelling key 17b is turned on (in the processing of step $S_{37}$ "Cancelling Button ON"), the data relating to the dealings being conducted are all reset (in the processing of step $S_{46}$ "Reset of data relating to dealings being conducted") thereby to restore the initial condition. In case, on the other hand, it is intended to accomplish the dealings at present by the manual pay-out processing, the cancelling key 17b is not turned on but the manual pay-out command key 22b is turned on (in the processing of step $S_{38}$ "Manual Pay-Out Key ON") to advance the operations to step $S_{39}$ "Clearance of all the Registers but the Pay-Out Register" so that the contents of all the registers (e.g., the register for ¥10000) but the pay-out register are cleared. The operations are further advanced to step $S_{40}$ "Storage of the content of Pay-Out Register in Manual Register" so that the content ( ¥16,800) of the pay-out register is fed to and stored in the manual pay-out register. As a result, the manual pay-out register is stored with the sum ¥16,800. The operations are further advanced to step $S_{41}$ "Display, manual pay-out processing and input demand of the content of Manual Pay-Out Register". In this step $S_{41}$, the manually payable sum input command display 36b is lit, and the sum displays 30b are operated to display the sum ¥16,800 thereby to command the cashier B to manually dispense the sum ¥16,800. As a result, the cashier B feeds the sum ¥16,800 as an input, the operations are further advanced to the printing operations of the steps $S_{28}$ and so on by the processings of steps $S_{42}$ "Input of manually payable sum" and $S_{43}$ "Entry sum=Manual Pay-Out Register" so that the slip is printed. When the supply of bank notes is short, the cashier is informed of this shortage in those ways by the electric near-end processings. Then, the cashier performs either the processing of operating the cancelling key 17b to cancel the dealings at present or the processing of manually dispensing the manually payable sum without cancelling the present dealings. Incidentally, the processings of steps $S_{44}$ "Display of operational error" and S₄₅ "Correcting Button ON" are the same as those of the aforementioned steps S₄₄ and S₄₅.

Incidentally, although the sum data are fed as the inputs to the pay-out reserve registers for the processing purposes, the number data may be fed as the inputs. On the other hand, the denominations or kinds of the bank notes to be reserved in bank note discharger are not limited to those exemplified in the foregoing embodiments. Moreover, since the bank notes are generally banded into a bundle of 100 notes for storage, the sum corresponding to the count number of the bank note bundle (e.g., ¥ one hundred, ¥ two hundred and so on in the case of bank notes of ¥10000) or the count number is detected by the operation control unit, when it is requested) so that the bank note bundle can be commanded to be manually dispensed.

As has been described hereinbefore, according to the present invention, there is provided a bank note dispensing method, in which, when a manually payable sum is contained in the sum requested, the sum other than the manually payable sum is discharged with the bank notes of preset or specified denominations from the bank note discharger so that they are temporarily stored in the temporary bank note storing place and in which the feeding operations of the manually payable sum are performed to confirm the manually payable sum so that the discharged bank notes can be taken out of the temporary bank note storing place. As a result, the cash dispensing work can be accomplished without fail while saving work. If, moreover, the coins are manually paid out, the coin discharger which is attached to the conventional bank note discharger can be dispensed with so that the cost for the production of the bank note dispensing apparatus can be reduced together with the cost for the facilities.

Although, in the embodiment thus far described, the electric near-end for the shortage of the bank notes is accomplished when the balance of the pay-out reserve sum for the requested sum is smaller than ¥ 0 (or 0 sheet), it may be naturally accomplished when said balance becomes smaller than a preset sum (or number of notes) other than the ¥ 0 (or 0 notes).

According to the present invention, moreover, there is provided a bank note dispensing apparatus, in which, when the bank note discharger is charged with the bank notes, the totalled sum (or sheet number) of the bank notes is fed as the input for each denomination of the charged bank notes so that it may be stored in advance, in which the remaining sum (or number) is calculated and stored each time the bank notes are paid out, and in which a warning is generated when the remaining sum (or number) becomes smaller than a preset value thereby to provide the electric near-end mechanism. As a result, independently of the newness of the bank notes, the remaining sum (or number) never becomes smaller than the preset value without generating the warning so that remarkable practical convenience can be attained.

What is claimed is:

1. A bank note dispensing method comprising the steps of: keying a key input unit to feed as an input the sum of money requested; classifying the input sum into the sum to be manually dispensed and into the remaining sum which is the remainder of the subtraction of the manually payable sum from said input sum; discharging said remaining sum with the bank notes either in preset denominations or in such denominations as are specified by the keying step of said key input unit; temporarily storing the discharged remaining sum of the bank notes automatically in a temporary storing place; and keying said key input unit to feed said manually payable sum as an input so that said remaining sum of the bank notes stored can be taken out.

2. A bank note dispensing method according to claim 1, further comprising the step of keying said key input unit after the feed of said input sum to feed said manually payable sum as an input so that said input sum may be classified into said manually payable sum and said remaining sum.

3. A bank note dispensing method according to claim 1, wherein the classifying step includes the step of automatically classifying the fractional sum of said input sum, which is smaller than a preset sum, as said manually payable sum.

4. A bank note dispensing apparatus comprising: a bank note dispensing mechanism having a bank note reservoir adapted to be charged with a preset number of bank notes; means made receptive of the totalled sum of the charged bank notes for storing said totalled sum as a pay-out reserve sum; means for calculating and storing the remaining pay-out reserve sum on the basis of the once stored pay-out reserve sum upon each bank note dispensing operation when the dispensing operations are started; means for effecting the calculating and storing operations and the bank note dispensing operations until the calculated remaining pay-out reserve sum becomes smaller than a preset sum; and means for interrupting the bank note dispensing operations when said calculated remaining pay-out reserve sum becomes smaller than said preset sum.

* * * * *